H. R. EDGECOMB.
PROCESS OF AND APPARATUS FOR MANUFACTURING COMPOSITE SHEET MATERIAL.
APPLICATION FILED NOV. 25, 1914.
1,239,894.
Patented Sept. 11, 1917.
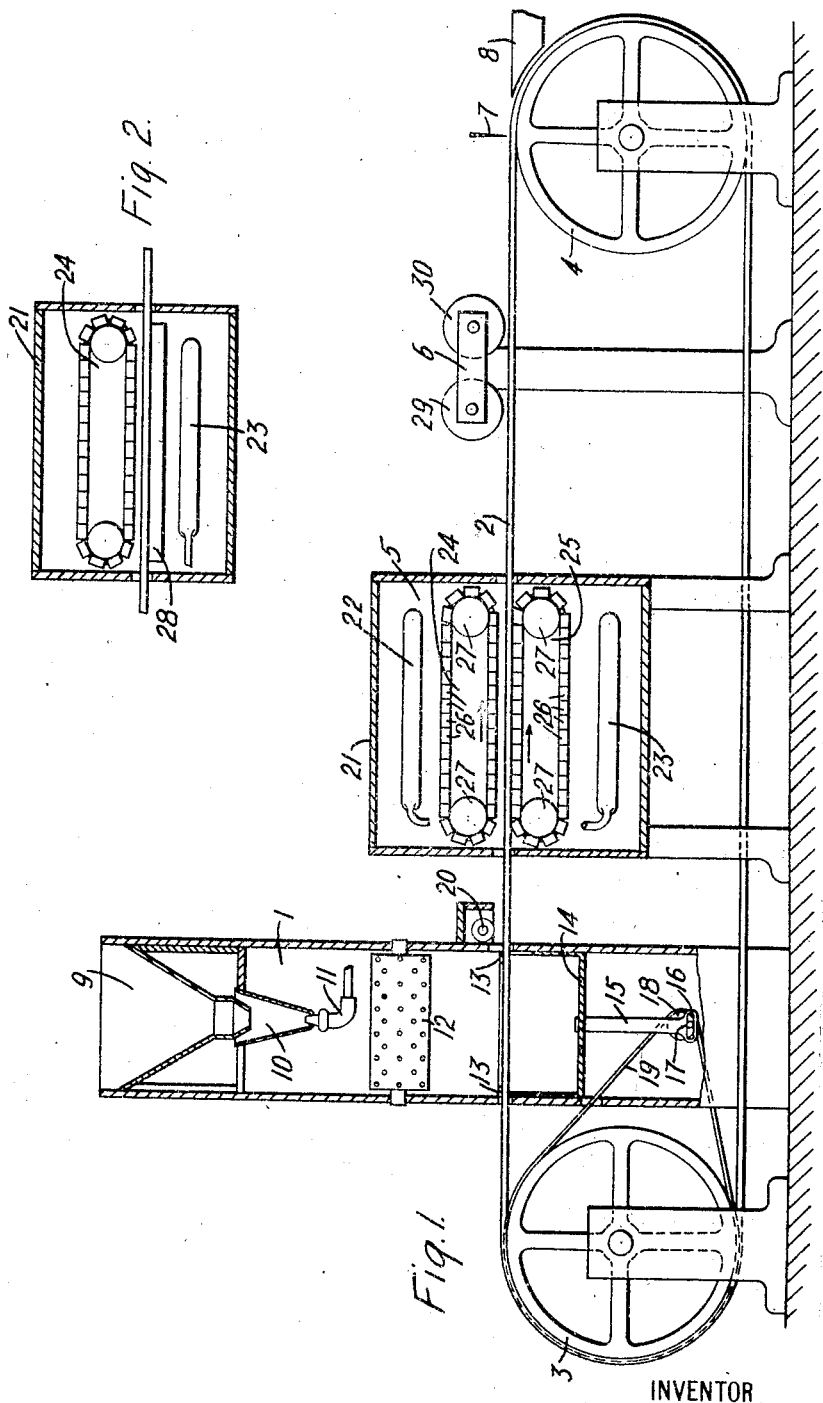
WITNESSES:
Fred A. Lind
R. D. Brown
INVENTOR
Henry R. Edgecomb
BY
Wesley G. Carr
ATTORNEY

UNITED STATES PATENT OFFICE.

HENRY R. EDGECOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF AND APPARATUS FOR MANUFACTURING COMPOSITE SHEET MATERIAL.

1,239,894.   Specification of Letters Patent.   Patented Sept. 11, 1917.

Application filed November 25, 1914. Serial No. 873,956.

*To all whom it may concern:*

Be it known that I, HENRY R. EDGECOMB, a citizen of the United States, and a resident of Wilkinsburg, in the county of Allegheny and State of Pennsylvania, have invented a new and useful Improvement in Processes of and Apparatus for Manufacturing Composite Sheet Material, of which the following is a specification.

My invention relates to the manufacture of composite sheet material, and it has special reference to the manufacture of composite electrical insulating sheets consisting of mica flakes and a binding material.

One object of my invention is to provide a process of automatically building up composite material of the above-indicated character in a continuous sheet and with a minimum expenditure of material, labor and time.

Another object of my invention is to provide simple, convenient and efficient apparatus for carrying out my automatic process.

The most successful method of building sheet mica insulating material that has heretofore been employed consists in feeding measured amounts of mica flakes and powdered binding material into the top of a relatively high tower, and allowing the mingled flakes and binder to distribute themselves over the surface of a plate or box which forms the bottom of the tower. When sufficient material has been deposited in the receiving box to form a finished plate of the desired thickness, the box carrying the assembled mica and binder is removed from the tower and the material is afterward subjected to heat and pressure in order to melt the binder and cause the mica flakes to adhere firmly together. This process produces insulating sheets of excellent quality, but it has the disadvantage that it is relatively slow and labor-consuming, on account of the several manipulations that are necessary and the fact that the operations cannot be continuously performed.

According to my present invention, the process outlined above is made continuous by substituting a slowly-moving belt for the plate or box now employed to receive the shower of commingled mica flakes and bond. This belt passes under the end of the tower, collects the falling material in a continuous layer, and carries the accumulated layer to heated pressure devices which serve to melt the binder and compress the mica into a firmly coherent plate, after which the plate is cooled and cut into sheets of any desired length.

In the accompanying drawing, Figure 1 is a longitudinal sectional view of apparatus suitable for carrying out my process, and Fig. 2 is a longitudinal sectional view of a modified form of a portion of the apparatus shown in Fig. 1.

The apparatus shown in the drawing comprises a mica building tower 1, a belt 2, passing around rollers 3 and 4, a heating device 5, a cooling device 6, a sheet-severing knife 7 and a sheet-receiving table 8. The mica building tower may be of any suitable and well known construction, such, for example, as that described and claimed in the patent to Sanborn, No. 1,074,576, granted September 30, 1913 and assigned to Westinghouse Electric & Manufacturing Company. As shown on the drawing, it consists of a receiving hopper 9 for receiving a measured continuous supply of mica flakes, a distributing hopper 10, an ejector 11 consisting of one or more air-blast nozzles for ejecting the mica flakes from the hopper 10, and a cylindrical sieve or bond distributer 12 which is adapted to contain comminuted dry fusible bonding material and to be rotated in any convenient manner for the purpose of sprinkling the powdered bond among the falling flakes of mica.

The mica and bond fall upon the belt 2, which is preferably of metal and is caused to advance slowly beneath the tower by means of power applied in any convenient manner to the roller 3 or the roller 4. When the operation of the machine begins, the mica will be deposited upon the belt in a layer of gradually increasing thickness until the belt has advanced a distance equal to the width of the tower, after which the layer will be uniform in thickness until the machine stops, provided proper supplies of mica are fed into the receiving hopper 9.

In their descent in the tower 1, the flakes distribute themselves with remarkable uniformity, but some of the flakes may fall in an inclined position against the sides of the tower and thus make the edges of the sheet slightly uneven. In order to avoid such unevenness, a set of vertically moving fingers 13 are provided adjacent to the walls of the tower and are caused to reciprocate vertically in any convenient manner, as by means of a frame 14 disposed beneath the traveling belt and reciprocated by means of an arm 15 provided with a slot 16 that is engaged by a pin 17 eccentrically mounted upon a disk 18 which is caused to rotate by means of a belt 19 passing around the roller 3 or a pulley coaxial with this roller. It will be evident that the fingers 13 will reciprocate rapidly during the operation of the machine and will even the edges of the mica plate. At the outgoing edge of the tower, near the belt 2, is disposed a roller 20 which is spaced from the belt 2 by approximately the thickness of the mica plate being formed, and which is intended to smooth down any mica flakes which may have fallen on edge.

After the belt leaves the tower 1, it passes through a heating device 5. In the form of machines shown in Fig. 1, the heating device consists of an oven 21 heated by two heating elements 22 and 23, which may be sets of gas burners or electric heating devices, and inclosing a pair of pressure members 24 and 25, each of which, as shown, consists of a series of flat plates 26 joined at their ends and passing over pulleys or sprocket wheels 27. The operation of each of these pressure devices is similar to that of the well known caterpillar tractor. The form of heating device shown in Fig. 2 comprises the oven 21 and the upper pressure members 24, but the lower pressure device 25 is replaced by a stationary metal platen 28. Either of the heating and pressing devices shown serves to melt the comminuted bond, expel any excess bond which may be present, and compress the mica flakes firmly together. After emerging from the oven 21, the belt 2 carries the mica plate to a cutting device, which is shown diagrammatically by the knife 7 and by which the plate is severed into sheets of any desired length, the sheets being received upon the table 8. If desired, the mica sheet may be cooled by means of the device 6, which, as shown, consists of a pair of rollers 29 and 30 through which cooling fluid may be passed. As modifications of this cooling process, the rollers 29 and 30 may be replaced by a cooled pressure device similar in construction to the pressure devices 24 and 25, or the severed sheets may be placed in a cold press for a short time.

Several distinct advantages result from the continuous operation described above. The necessary apparatus occupies but little more space than is used in carrying out the existing discontinuous processes, and the handling and reheating of heavy iron plates is avoided. Furthermore, the amount of finished material that may be provided in a given time by a given number of operators may be greatly increased with no corresponding increase in labor costs.

According to a modification of the process set forth above, a web of paper is fed upon the surface of the belt 2 and caused to pass continuously beneath the tower 1, receiving the commingled mica flakes and bond as in the modification described above. If desired, the paper may be coated with liquid shellac or other adhesive material before being fed beneath the tower, and, in this case, the amount of comminuted solid bond to be used may be greatly reduced or such bond may even be entirely dispensed with.

As will be evident from the foregoing discussion, my process and apparatus are capable of numerous modifications which are in part suggested above and which may be further devised by persons skilled in the art to which my invention appertains. In view of these variations of which my invention is capable, it is to be understood that it is not restricted to the precise manipulations and structures disclosed above but is limited only by the scope of the appended claims.

I claim as my invention:

1. A process of manufacturing sheet material that comprises distributing a shower of commingled flake material and a comminuted dry bond upon a continuously moving surface and applying heat and pressure to the said material while it is carried by the said surface.

2. A process of manufacturing sheet material that comprises distributing a shower of commingled mica flakes and a comminuted dry bond upon a continuously moving surface and applying heat and pressure to the said material while it is carried by the said surface.

3. A process of manufacturing sheet material that comprises distributing a shower of commingled flake material and a comminuted dry bond upon a continuously moving plane surface and applying heat and pressure to the said material while it is carried by the said plane surface.

4. A process of manufacturing sheet material that comprises distributing a shower of commingled mica flakes and a comminuted dry bond upon a continuously moving plane surface and applying heat and pressure to the said material while it is carried by the said plane surface.

5. A process of manufacturing sheet material that comprises distributing a shower of commingled flake material and a comminuted dry bond upon a continuously moving metallic surface and applying heat and pressure to the said material while it is carried by the said surface.

6. A process of manufacturing sheet material that comprises distributing a shower of commingled mica flakes and a comminuted dry bond upon a continuously moving metallic surface and applying heat and pressure to the said material while it is carried by the said surface.

7. A process of manufacturing sheet material that comprises distributing a shower of commingled flake material and a comminuted dry bond upon a continuously moving surface, applying heat and pressure to the said material while it is carried by the said surface, and thereafter cooling the same.

8. A process of manufacturing sheet material that comprises distributing a shower of commingled flake material and a comminuted dry bond upon a continuously moving metallic surface, applying heat and pressure to the said material while it is carried by the said surface, and thereafter cooling the same while still carried by the said surface.

9. A process of manufacturing sheet material that comprises distributing a shower of commingled flake material and a comminuted dry bond upon a continuously moving surface, applying heat and pressure to the said material while it is carried by the said surface, and thereafter cooling the same and severing it into sheets.

10. A process of manufacturing sheet material that comprises distributing a shower of commingled flake material and a comminuted dry bond upon a continuously moving metallic surface, applying heat and pressure to the said material while it is carried by the said surface, and thereafter cooling the same while still carried by the said surface and severing it into sheets.

11. A process of manufacturing sheet material that comprises distributing a shower of commingled flake material and a comminuted dry bond upon a continuously moving plane surface, flattening the said flake material upon the said surface, and applying heat and pressure to it while it is carried by the said surface.

12. A process of manufacturing insulating sheet material that comprises distributing a shower of commingled mica flakes and a comminuted dry bond upon a continuously moving metallic surface, applying heat and pressure to the said material while it is carried by the said surface, severing the said material into sheets and thereafter subjecting the severed sheets to cold pressure.

13. A machine for making composite sheet material comprising means for distributing a shower of commingled flake material and a comminuted dry bond, a metallic sheet adapted to move adjacent to the said distributing means and to receive the said commingled material, and means for applying heat and pressure to the said material while it is carried by the said sheet.

14. A machine for making composite sheet material comprising means for distributing a shower of commingled flake material and a comminuted dry bond, a metallic belt adapted to move continuously and to receive the said commingled material, means for flattening the said material upon the said belt, and means for applying heat and pressure to the said material while it is carried by the said belt.

15. A machine for making composite sheet material comprising means for distributing a shower of commingled flake material and a comminuted dry bond, a metallic belt adapted to move continuously and to receive the said commingled material, means for applying heat and pressure to the said material while it is carried by the said belt, and means for cooling the said heated and pressed material.

16. A machine for making composite sheet material comprising means for distributing a shower of commingled flake material and a comminuted dry bond, a metallic belt adapted to move continuously and to receive the said commingled material, and means for applying heat and pressure to the said material while it is carried by the said belt, the said means comprising an oven, coöperating pressure members within the said oven, and means for heating the said oven.

17. A machine for making composite sheet material comprising means for distributing a shower of commingled flake material and a comminuted dry bond, a belt adapted to move continuously and to receive the said commingled material, and means for applying heat and pressure to the said material while it is carried by the said belt, the said means comprising an oven, coöperating pressure members within the said oven, at least one of the said pressure members being adapted to move with the said material, and means for heating the said oven.

18. A machine for making composite sheet material comprising means for distributing a shower of commingled flake material and a comminuted dry bond, a belt adapted to move continuously and to receive the said commingled material, and means for flattening the said material upon the said belt, the said means comprising vertically-reciprocating fingers disposed adjacent to the said belt.

19. A machine for making composite sheet material comprising means for distributing a shower of commingled flake material and a comminuted dry bond, a belt adapted to move continuously and to receive the said commingled material, and means for flattening the said material upon the said belt, the said means comprising vertically-reciprocating fingers disposed adjacent to the said belt, and a roller adapted to engage the surface of the said material.

20. A machine for making composite sheet material comprising means for distributing a shower of commingled flake material and a comminuted dry bond, a belt adapted to move continuously and to receive the said commingled material, means for applying heat and pressure to the said material while it is carried by the said belt, means for cooling the said heated and pressed material, and means for severing the said material into sheets.

In testimony whereof, I have hereunto subscribed my name this 18th day of Nov., 1914.

HENRY R. EDGECOMB.

Witnesses:
GOLDIE E. McGEE,
B. B. HINES.